(12) United States Patent
Schibilla

(10) Patent No.: US 6,384,999 B1
(45) Date of Patent: May 7, 2002

(54) REWRITE WITH EMBEDDED REASSIGN FOR DATA RECOVERY FROM MARGINALLY DEFECTIVE DATA SITES ON A DATA STORAGE DEVICE

(75) Inventor: Mark R. Schibilla, Rochester, MN (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/290,460

(22) Filed: Apr. 12, 1999

(51) Int. Cl.$^7$ .............................. G11B 5/09; G11B 27/36
(52) U.S. Cl. ............................. 360/53; 360/31; 714/8; 714/704
(58) Field of Search ..................... 360/53, 31; 714/6, 714/7, 8, 704, 710, 701, 769

(56) References Cited

U.S. PATENT DOCUMENTS 5,235,585 A    8/1993   Bish et al.
5,271,018 A   12/1993   Chan
6,118,608 A * 9/2000   Kakihara et al. ............ 360/53

* cited by examiner

Primary Examiner—Regina N. Holder
(74) Attorney, Agent, or Firm—Milad G Shara

(57) ABSTRACT

A method for recovering data from marginally defective data sites on a disk drive surface. If a user data site is determined to be marginally defective during a read operation, a read error recovery procedure is performed on the marginally defective data site. The read error recovery procedure begins by conditionally reassigning data from the marginally defective data site to a spare data site. Next, the data from the marginally defective data site is rewritten to the marginally defective data site. If the data rewrite operation is successful, the method ends. If the data rewrite operation fails, the conditionally reassigned data from the marginally defective data site is reassigned to the spare data site.

17 Claims, 5 Drawing Sheets

REWRITE WITH EMBEDDED REASSIGN FOR DATA RECOVERY FROM MARGINALLY DEFECTIVE DATA SITES ON A DATA STORAGE DEVICE

BACKGROUND OF THE INVENTION

1. Field of the Invention

The present invention relates to hard disk drives. More particularly, the present invention relates to a method for recovering data from marginally defective data sites on a disk surface.

2. Description of the Related Art

Hard disk drives store large volumes of data on one or more disks mounted on a spindle assembly. Disk drives employ a disk control system for interfacing with a host (e.g., a computer) to control the reading and writing of data on a disk. Each disk includes at least one disk surface which is capable of storing data. On each disk surface, user data is stored in concentric circular tracks between an outside diameter and an inside diameter of the disk.

As a result of the manufacturing process, defective data sites may exist on the disk surfaces of the disk drive. These defective data sites are termed "primary defects." A defect discovery procedure is performed to locate these defects and mark them out as defective locations on the disk surface which are not available for use. A typical defect discovery procedure includes writing a known data pattern to the disk surface and subsequently reading the data pattern from the disk surface. Defective data sites are identified by comparing the data pattern read from the disk surface with the known data pattern written to the disk surface.

Following the defect discovery procedure, defective data sites are put in a primary defect list (PLIST). The primary defect list is used during formatting of the disk surface to generate a defect management table. The defective data sites contained within the primary defect management table are skipped during normal operation of the disk drive. Once identified in the primary defect management table, the defective data site may not be used for storing data.

Defective data sites encountered after formatting the disk surface are known as "grown defects" or "secondary defects". Grown defects often occur in locations adjacent to defective data sites found during defect discovery. Grown defects are also written to a list known as the grown defect list (GLIST), similar to that utilized for the primary defects. Grown defects encountered during the operation of the disk drive are added to a secondary defect management table. The secondary defect management table is utilized along with the primary defect management table during the operation of the disk drive for the identification of defective data sites on the disk surface. The defective data sites residing within the secondary defect management table are reassigned or "vectored" (i.e., mapped via an index pointer) to spare data site locations via a cross-reference entry (cylinder number, head number, and data sector number).

Defects such as "primary defects" and "grown defects" are known as hard sector errors. A hard sector error is essentially permanent in nature, thus the sector cannot be recovered. A disk may also contain transient or "soft" errors. A transient error is defined as an error or defect which clears over a period of time. For example, a transient error may occur due to a thermal asperity on the disk surface. A retry mode may be entered, wherein the command (such as a read) is retried a number of times allowing sufficient time to pass for the transient error to clear. Transient errors are also logged on the drive as they occur.

If the transient or "soft" error rate on a particular sector reaches an unacceptable level during normal read operations, the hard drive may attempt to rewrite the data to the data sector encountering the soft errors. The rewrite operation typically reads the data from the sector encountering the soft errors, copies the data to a data buffer, then attempts to rewrite the data to the data sector encountering the soft errors. Data is copied to the data buffer so that if the rewrite operation fails, the data is still available. After the data has been rewritten, the drive verifies the rewrite operation. If no problems are encountered after the rewrite, the drive resumes normal operation. If the rewrite operation fails, the data in the data buffer must be reassigned to alternative data sectors on the disk.

Several methods have been developed for reassigning defective data sites on a disk. Chan (U.S. Pat. No. 5,271,018) describes a data site slipping scheme to reassign defective data sites on a disk's surface. In data site slipping, a defined number of spare sites are located at the end of a data track, data partition, or data zone for handling defects. When a defect is discovered, the defective data site is marked as defective (i.e., to be skipped in the future), the data from the next non-defective data site is saved in a data buffer, and the data from the defective data site is "slipped" to the next non-defective data site. The saved data from the data buffer is then slipped in a similar manner to the next non-defective data site until the last slipped data site occupies the first available spare data site. While the data site slipping scheme of Chan allows data to remain contiguous, the scheme of Chan may result in time consuming, inefficient reassignments of data blocks when a defective site is discovered thereby impacting disk drive performance.

Bish et al. (U.S. Pat. No. 5,235,585) provides another method for reassigning defective data sites on a disk via a vectoring operation. Bish et al. locates spare data sites for replacing grown secondary defects found during use. A secondary defect management table is maintained for tracking the spare data sites that have been previously used for replacements of other secondary defects. When a secondary defect address is found, a secondary defect list is updated both on the disk and in the drive's memory. A spare data site for replacing the secondary defect is located by first calculating a group number to determine which group the secondary defect is located in. Next, the boundaries for a plurality of spare data sites allocated for that group is determined. After searching the replacement data site list, the first available spare data site of the plurality of spare data sites is identified as the replacement data site. If all of the plurality of spare data sites have been previously assigned as replacement data sites, a spare data site is instead located from a plurality of spare data sites allocated to a neighboring group. After locating the spare data site, its physical address is returned and the spare data site is logged in the secondary defect management table as a "vectored" data site. The reassignment scheme of Bish eliminates the inefficiencies of the Chan slip data site reassignment scheme, since only a single block of data is moved during the reassignment. However, reassigning data to non-contiguous spare data sites eliminates contiguous ordering of the data, resulting in additional seeks to and from the spare data site location during a read operation.

Rewriting data to the same data sector is almost always preferable to reassigning data to an alternate data sector. By rewriting data to the same data sector, the inefficiencies of moving potentially thousands of blocks of blocks via data slip scheme described in Chan can be avoided. Also, rewriting preserves the contiguous ordering of the data. Thus, during read operations, no time-consuming data vector seek operations to alternative data sectors in a remote area of the disk are necessary, as is required by reassignment schemes such as described in Bish et al.

Unfortunately, the rewrite operation is sometimes unsuccessful even after multiple retries, so a reassignment operation is required to preserve the data. Also, the rewrite operation is susceptible to data loss. Even though data is preserved in a data buffer while the rewrite operation is attempted, the data in the data buffer can be lost if a power cycle occurs while the rewrite operation is executing. Furthermore, the time required to reassign the sector is sequential and additive to the rewrite process.

There is a continuing need therefore for a defect management scheme which minimizes operational inefficiencies, while dealing effectively with defective data sites which are discovered during disk operations.

SUMMARY OF THE INVENTION

The present invention provides a method for operating a disk drive, including recovering data from a marginally defective data site on a disk surface. The hard disk drive employs a vector reassignment method to reassign data from the defective data sites to spare data sites. The method for operating a disk drive begins by reading a block of data from a data site. The method then determines whether the data site is a marginally defective data site. Next, the method first writes the block of data to a spare data site within a pool of spare data sites. The method then determines whether the marginally defective data site is a defective data site. If the data site is marginally defective, the method marks the marginally defective data site as a defective data site, adds the defective data site to a list of defective data sites, and updates a vector reassignment table to cross-reference the defective data site to the spare data site.

In one embodiment of the present invention, the step of determining whether the marginally defective data site is a defective data site further includes the steps of writing the block of data back to the marginally defective data site and verifying that the block of data written back to the marginally defective data site can be successfully read.

In one embodiment of the present invention, a scoring method is utilized to determine whether a data site is a marginally defective data site. In a preferred embodiment, the scoring method includes an analysis of the number of retries encountered while reading the data site during the normal operation of the disk.

Checkpoint information is saved after selected steps of the method, such that if an interruption occurs during the data recovery, the data recovery process may be completed. More specifically, if an interruption occurs while writing the block of data back to the marginally defective data site, on resuming operation after the interruption the defective data site is entered in a defect table and the data site is reassigned to the spare data site.

In one embodiment of the present invention, the step of updating the vector reassignment table to cross-reference the defective data site to the spare data site includes defining a vector cross-reference entry for the vector reassignment table associated with the list of defective data sites. The vector cross-reference entry includes a reference to the defective data site which is reassigned and a corresponding reference to the spare data site. The step of updating the vector reassignment table to cross-reference the defective data site to the spare data site also includes making a vector cross-reference entry in the vector reassignment table to cross-reference the defective data site with the corresponding spare data site. The spare data site is chosen from one or more spare data sites located on the disk. The one or more spare data sites are contiguously grouped into a pool of spare data sites. In one embodiment of the present invention, a single pool of data sites exists on each disk.

If the marginally defective data site is determined to be a defective data site, the method further includes the step of incrementing a pointer to point to the next available spare data site within the pool of spare data sites. In one embodiment, the method of the present invention is implemented in firmware residing within a disk control system of the disk drive.

The present invention also provides a method for recovering data from a marginally defective data site on a disk surface. This method begins by providing a pool of spare data sites. The method also provides a read error recovery procedure, where the read error recovery procedure includes a plurality of recovery steps. The method next reads a data block from a user data site, and if an error occurs while reading the data block, the method executes the read error recovery procedure to recover the data block. The method then determines whether the user data site is marginally defective, and conditionally reassigns the data block to a conditionally reassigned spare data site within the pool of spare data sites. Next, the method writes a copy of the data block to the conditionally reassigned spare data site, and also writes the data block in the user data site. The method then performs a predetermined subset of the plurality of recovery steps to recover the data block. If the data block is not recovered within the predetermined subset, the method reassigns the data block to the conditionally reassigned spare data site.

In one embodiment of the present invention, the step of reassigning the data block to the conditionally reassigned spare data site further includes marking the marginally defective data site as a defective data site, adding the user data site to a list of defective data sites, and updating a vector reassignment table to cross-reference the defective data site to the spare data site.

In one embodiment of the present invention, the step of updating the vector reassignment table to cross-reference the defective data site to the spare data site further includes defining a vector cross-reference entry for the vector reassignment table associated with the list of defective data sites. The vector cross-reference entry includes a reference to the defective data site which is reassigned and a corresponding reference to the spare data site. The step of updating the vector reassignment table to cross-reference the defective data site to the spare data site also includes making a vector cross-reference entry in the vector reassignment table to cross-reference the defective data site with the corresponding spare data site.

In this second method, checkpoint information is saved after selected steps of the method, such that if an interruption occurs during the data recovery, the data recovery process may be completed. More specifically, if an interruption occurs while writing the block of data back to the marginally defective data site, on resuming operation after the interruption the defective data site is entered in a defect table and the data site is reassigned to the spare data site.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention. Within the drawings, like numbers designate like elements.

DETAILED DESCRIPTION

Figure 1:
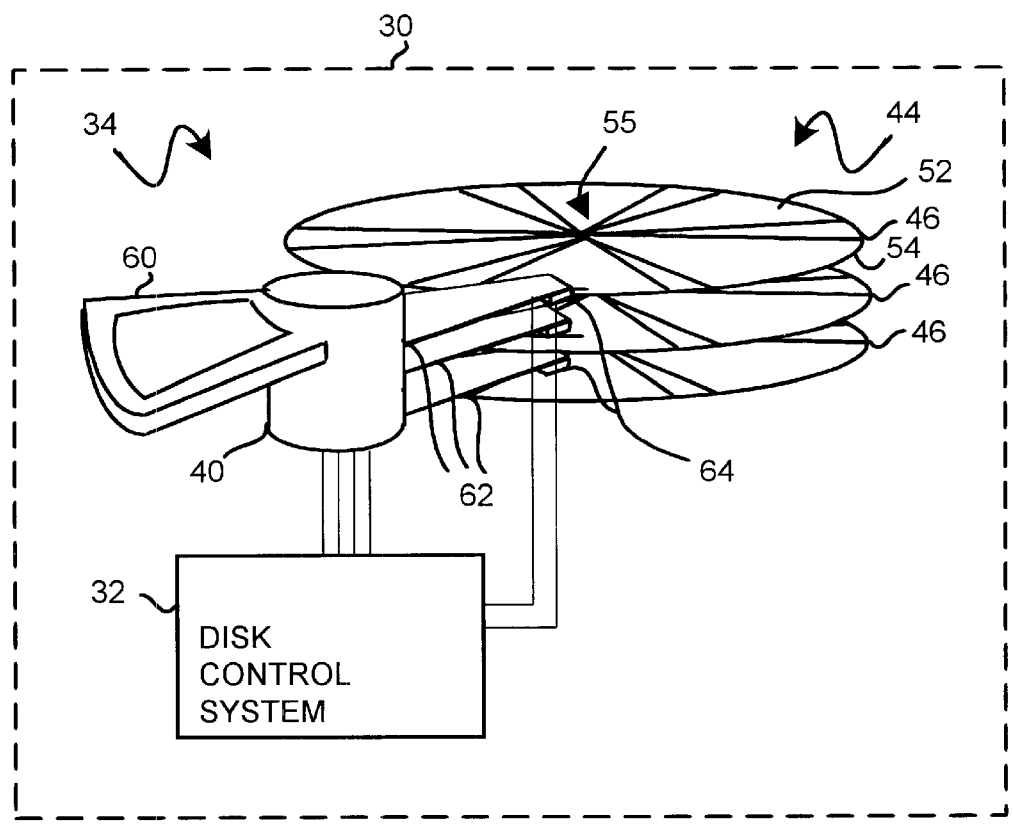
FIG. 1 is a block diagram illustrating a hard disk drive system in accordance with the present invention.

FIG. 1 is a block diagram illustrating a hard disk drive in accordance with the present invention. Disk drive 30 includes a disk control system 32 (e.g., a controller) and a head disk assembly (HDA) 34. Disk control system 32 includes circuitry and processors which provide an intelligent disk control system interface between a host system (not shown) and HDA 34 for execution of read and write commands. The host system can include a microprocessor based data processing system such as a personal computer, or other system capable of performing a sequence of logical operations. Further, disk control system 32 includes an embedded servo system for controlling the HDA 34. Disk control system 32 can be similar to other disk control systems known to those skilled in the art. Finally, disk control system 32 includes firmware for implementing the method for recovering marginally defective data sites on a disk surface of the present invention.

HDA 34 include a rotary actuator assembly 40 and a disk assembly 44. Disk assembly 44 includes one or more magnetic media disks, such as indicated at 46. Disks 46 are stacked on a spindle assembly (not shown) for rotating disks 46 at a high rate of speed. Each disk 46 preferably has two disk recording surfaces (i.e., disk surfaces) capable of storing data thereon, such as indicated at 52 and 54. Each disk surface has a plurality of repeating servo track patterns defining radially spaced-apart servo tracks, generally indicated at 55.

Rotary actuator assembly 40 includes a voice coil motor (VCM) 60 and multiple actuator arms 62 extending from VCM 60. Each actuator arm 62 corresponds to a respective disk, and may have one or two transducer heads 64 disposed at a distal end. Each transducer head 64 is associated with a corresponding disk surface 52, 54.

Figure 2:
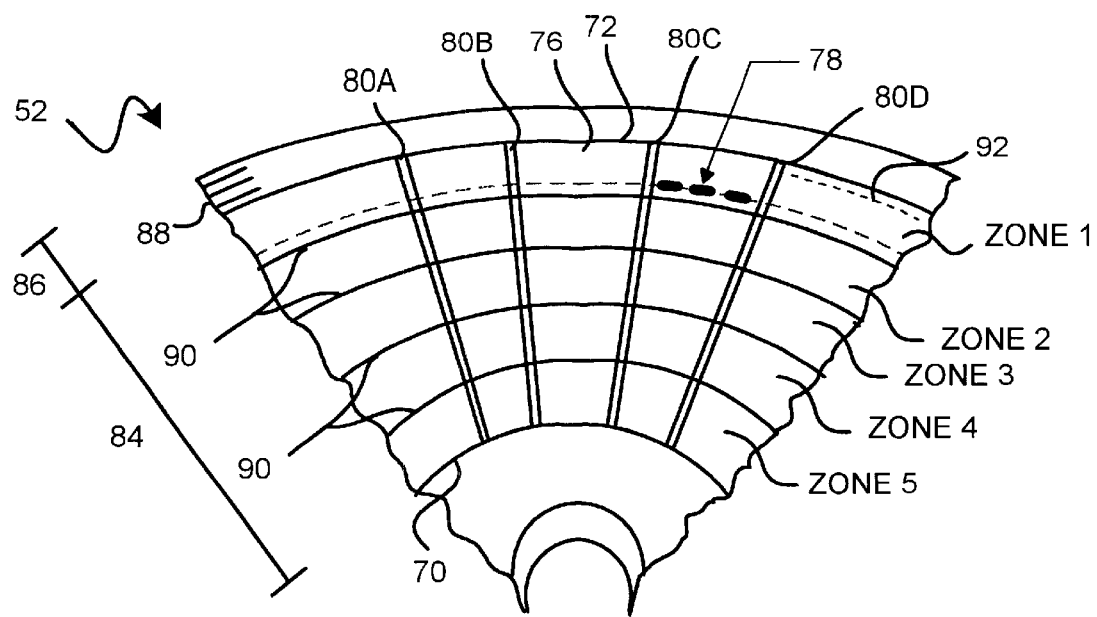
FIG. 2 is partial plan view of a disk surface having data sites and a pool of spare reassignment data sites.

FIG. 2 is partial plan view of a disk surface having data sites, including at least one marginally defective data site, and a pool of spare reassignment data sites. Disk surface 52 includes an inner boundary 70 and an outer boundary 72. Data is stored on concentric, circular tracks, indicated by representative dashed line 76, between inner boundary 70 and outer boundary 72. Recorded information (i.e., user data) on the disk surface is divided into data regions or groups of data sectors 78 (i.e., data sites). Information for a servo system tracking the position of heads 64 is recorded in embedded servo sectors or servo "wedges" placed in radially continuous narrow regions between groups of data sectors 78, indicated at 80A, 80B, 80C and 80D. Servo information is contained in the servo sectors 80A, 80B, 80C and 80D in a number of fields. Typically, there are a plurality of data sectors 78 grouped between pairs of servo "wedges".

Disk surface 52 includes a user data band 84 (or user data area) and a reserved band 86 (or reserved area). User data band 84 includes a plurality of user data tracks on the disk surface 52. The reserved band 86 is located outside the user data band 84, and typically comprises a number of "reserved" data tracks (e.g. 1 to 20 data tracks), indicated at 88. The user data band on disk surface 52 is used for storing user data during operation of the disk drive 30. The reserved band of the disk surface is utilized for storing drive specific data or "optimization" data.

Using zone recording techniques, groups of adjacent data tracks are assigned to a plurality of zones between the inner boundary 70 and the outer boundary 72. In the illustrated embodiment, disk surface 52 has been partitioned into five physical zones, illustrated by partitions 90, labeled ZONE 1, ZONE 2, ZONE 3, ZONE 4, and ZONE 5. Disk surface 52 may be partitioned into any desirable usable number of zones, which more typically ranges between 10 and 16 zones. The establishment of zones allows for efficiency in recording by varying recording frequencies to maintain approximately constant linear bit density across the disk as is well known in the art.

In one embodiment of the present invention, disk surface 52 includes a spare pool 92 of contiguous data sites located at the outer diameter of a physical zone. Data sites within the spare pool 92 are utilized by the present invention when reassigning data from a defective data site. In a preferred embodiment, spare pool 92 contains approximately 1000 contiguous data sites.

Figure 3:
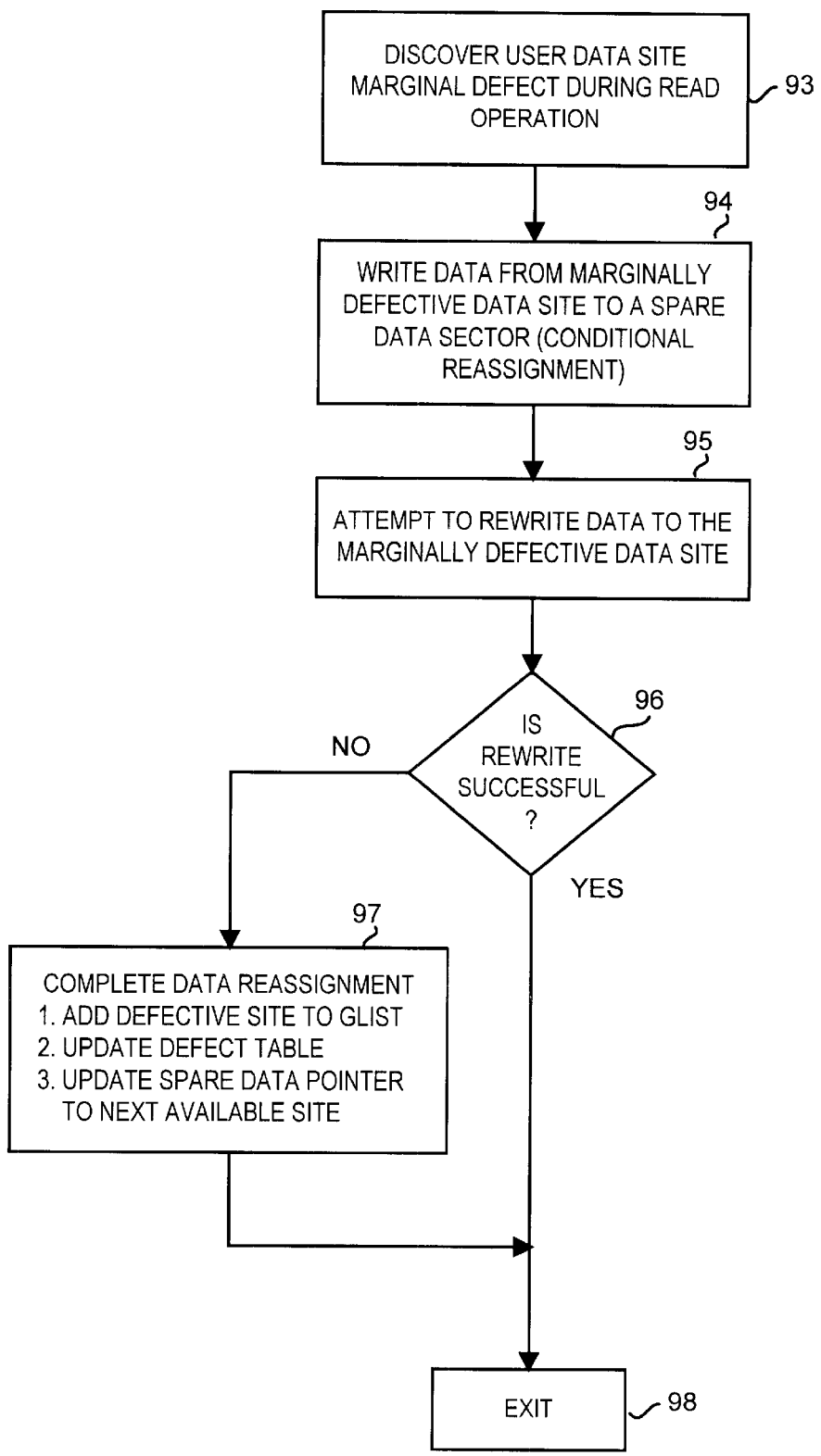
FIG. 3 is a generalized, high level flow chart of the rewrite with embedded reassign method for data recovery from marginally defective data sites in accordance with the present invention.

FIG. 3 is a generalized, high level flow chart of the rewrite with embedded reassign method for data recovery from marginally defective data sites in accordance with the present invention. The present invention begins by discovering user data sites that contain marginal defects, as indicated at step 93. During operation of disk drive 30, data sites 78 containing user data are read from disk surface 52. In some instances, the disk read operation encounters difficulty when reading a particular data site 78. As an example, multiple retries may be required in order to successfully read data from the data site. In one embodiment of the present invention, a scoring algorithm is used to identify data sites that have exceeded a predefined performance threshold (e.g., the number of read retries).

Data sites which exceed the predefined performance threshold are characterized as "marginally defective" sites. Marginally defective data sites are defined as data sites that are still operational, but which frequently encounter recoverable errors during normal operation of the disk drive. Marginally defective data sites are a concern because such data sites may develop into "hard error" (i.e., unrecoverable) data sites as time progresses. Also, marginally defective data sites detrimentally impact performance of the disk drive, since multiple read retries are often required to read data from the marginally defective data sites during normal operation of the disk drive.

Thus, when marginally defective data sites have been identified by the present invention, the present invention recovers data from the marginally defective data site, and writes the recovered data to a spare data site elsewhere on the disk surface 52 indicated in step 94. This operation is known as a conditional reassign. The conditional reassign serves a two-fold purpose. First, writing the data from the marginally defective data site to an alternate location provides a backup copy of the data should the disk drive encounter an interruption (such as a power cycle) while attempting to rewrite data to the marginally defective data site. Secondly, copying data to a spare data site is the first step required in a data reassignment operation. Thus, if the rewrite operation fails, a portion of the reassignment operation has already been performed, providing a performance enhancement.

The method of the present invention saves checkpoint information after key operations have been performed, such that if an interruption occurs during the data recovery, the data recovery may be resumed at the point of the interruption. As mentioned earlier, if an interruption (i.e., such as a power cycle) occurs while writing the block of data back to the marginally defective data site, the data recovery process may be completed. More specifically, if an interruption occurs while writing the block of data back to the marginally defective data site, on resuming operation after the interruption the defective data site is entered in a defect table and the data site is reassigned to the spare data site.

As mentioned above, it is almost always preferable to "rewrite" data to a marginally defective data site, rather than reassign data from the marginally defective data site to a spare data site elsewhere on the disk. Thus, this conditional reassignment is only the preliminary stage of the reassignment operation. While the data has been copied from the marginal data site to the spare data site, no links (i.e., pointers) have yet been established between the marginal data site and the spare data site. Thus, this conditional reassignment is "a work in progress" which will only be completed if the attempt to rewrite data to the marginally defective data site fails.

As indicated at block 95, the method of the present invention attempts to rewrite data to the marginally defective data site. Rewriting data back to the marginally defective data site is preferable to reassigning data from the marginally defective data site to a spare data site elsewhere on the disk because rewriting the data back to the same data site maintains the contiguous arrangement of the data. In other words, read operations perform much better when data is arranged contiguously, rather than having to seek to a spare data site located elsewhere on the disk surface and back again to the next user data site, as is required with data reassignment.

After the rewrite operation has been performed to the marginally defective data site 95, the present invention next checks to see if the rewrite operation is successful, as shown at step 96. If the rewrite operation completed successfully, the data site has been successfully recovered, and the method of the present invention ends, as indicated at step 98. However, if the rewrite operation was not successful, the marginally defective site is reclassified as a defective data site, and the conditional reassignment now becomes a reassignment, as indicated at step 97. In order to complete the reassignment operation, the method adds the defective site to the grown defect list for the disk drive, updates the drive defect table to identify the defective site as a reassigned (i.e., vectored) data site, and a pointer is incremented to point to the next available spare data site within the pool of spare data sites 92. After the reassignment is complete, the method of the present invention ends, as indicated at step 98.

Figure 4:
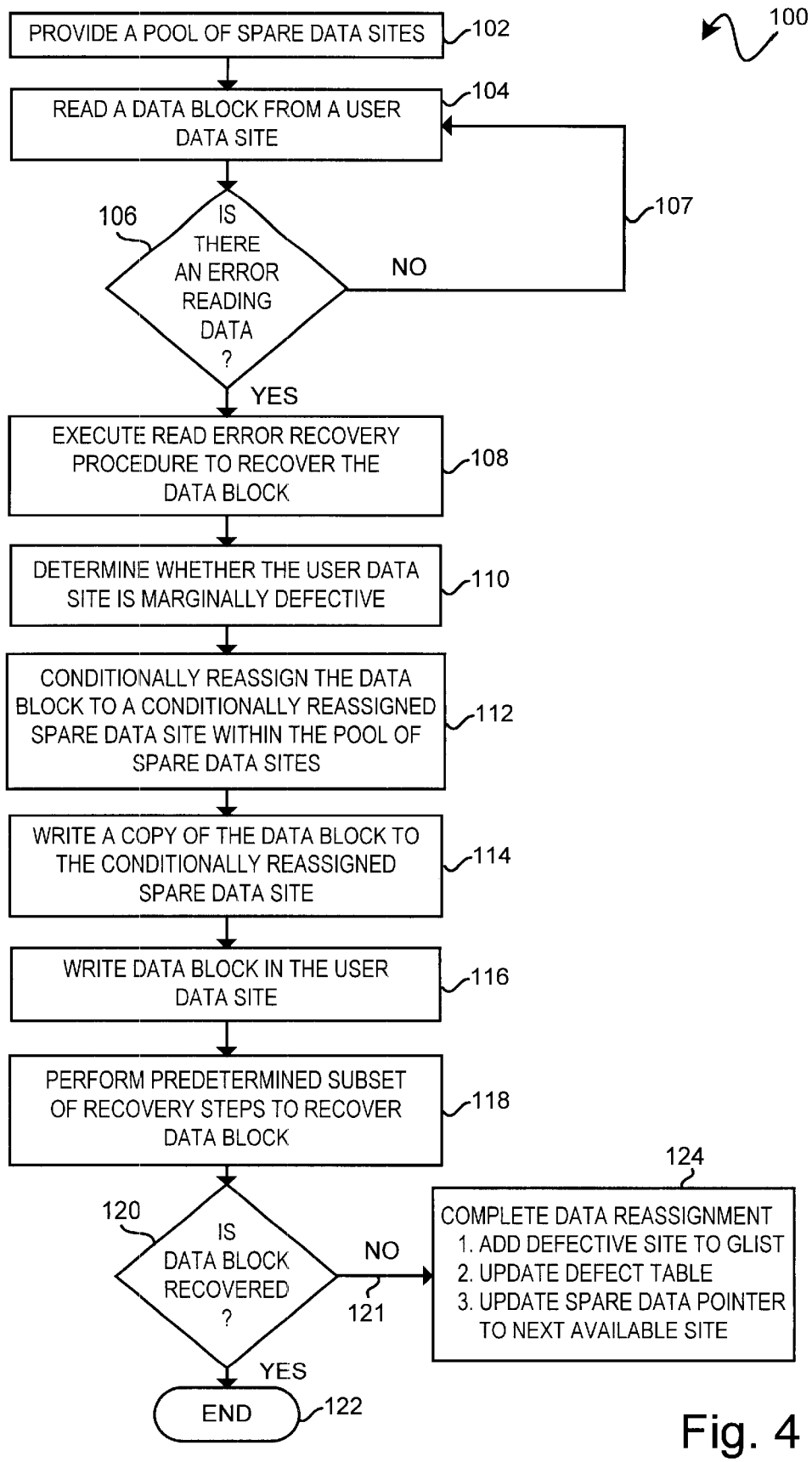
FIG. 4 illustrates a flow chart of the method for recovering marginally defective data sites on the disk surface of a disk drive.

FIG. 4 illustrates a flow chart of the method for recovering marginally defective data sites on the disk surface of a disk drive, shown generally at 100. The data recovery method of the present invention begins by providing the pool of spare data sites (FIG. 2, element 92) used for data reassignment of defective data sites (i.e., grown defects), as indicated at step 102.

Next, the method reads a data block from a user data site on the disk surface, as indicated at step 104. If no error is encountered in the read operation, as shown at 106, the next data block is read, as indicated at 107. If an error is encountered in the read operation, the method executes a read error recovery procedure to recover the data block from the user data site, as indicated at step 108. Read error recovery procedure step 108 may utilize a variety of techniques to recover the data block from the user data site. For example, read error recovery procedure step 108 attempts multiple retries of the read operation in order to recover the data block.

After the data block has been recovered from the data site, the method next determines whether the user data site is marginally defective, as indicated at step 110. In one embodiment of the present invention, the disk drive utilizes a scoring algorithm which provides a general indication of the "health" of a data site. The scoring algorithm analyzes historical performance information for the data site (i.e., the number of "read errors", and the number of retries required to read the data block) when determining a performance metric for the data site. The performance metric from the data site is then compared against a predefined performance threshold in order to determine if the data site is marginally defective.

After the data site has been determined to be marginally defective, the method next conditionally reassigns the data block from the marginally defective site to a spare data site located elsewhere on the disk surface, as indicated at step 112. This conditional reassignment copies the data block to the spare data site, as shown at step 114, but does not establish any pointers (i.e., vectors) from the marginally defective site to the spare data site, as is required by a traditional reassignment operation. Since the data block needs to be "backed up" before attempting a rewrite operation to the marginal data site (i.e., in case of an operational interruption, such as a power cycle), copying the data block to a data site location also utilized by data site reassignment implicitly provides the "reassignment first step" should the rewrite fail and a subsequent reassignment operation be required. Thus, copying the data block to the spare data site serves the dual purpose of providing a data backup should a failure occur during the rewrite operation to the marginally defective data site, and providing a "head start" for reassignment of the data block should the rewrite operation fail.

At step 116, the method re-writes the data block back to the marginally defective user data site. As mentioned above, it is always preferable to "rewrite" before "reassigning" a defective data block. At step 118, the method then performs a predetermined subset of recovery steps to recover the data block. At 120, the method determines whether the data block was recovered i.e. the rewrite operation was successful. This determination is made through a data verification procedure. If the rewrite was successful, the method ends, as indicated at 122. The partially completed, conditional reassignment operation is implicitly terminated, because no pointers were ever established between the marginal data site and the spare data site, and the spare data site pointer was never advanced. Thus, the next reassignment operation will simply overwrite the data in the spare data site currently pointed to by the spare data site pointer.

However, if the rewrite was unsuccessful, the data block is reassigned to the conditionally reassigned spare data site, by adding the defective site to the Glist, updating the defect table, and updating the spare data pointer to the next available site as shown in step 124. Simply stated, the conditional reassignment is "finalized" into a complete reassignment. This is accomplished by providing vectors (i.e., pointers) from the marginally defective data site to the spare data site receiving the data block. Defect management tables are updated to reflect that the defective data site is now a vectored data site, and the spare data site pointer is updated to point to the next available site.

Figure 5:
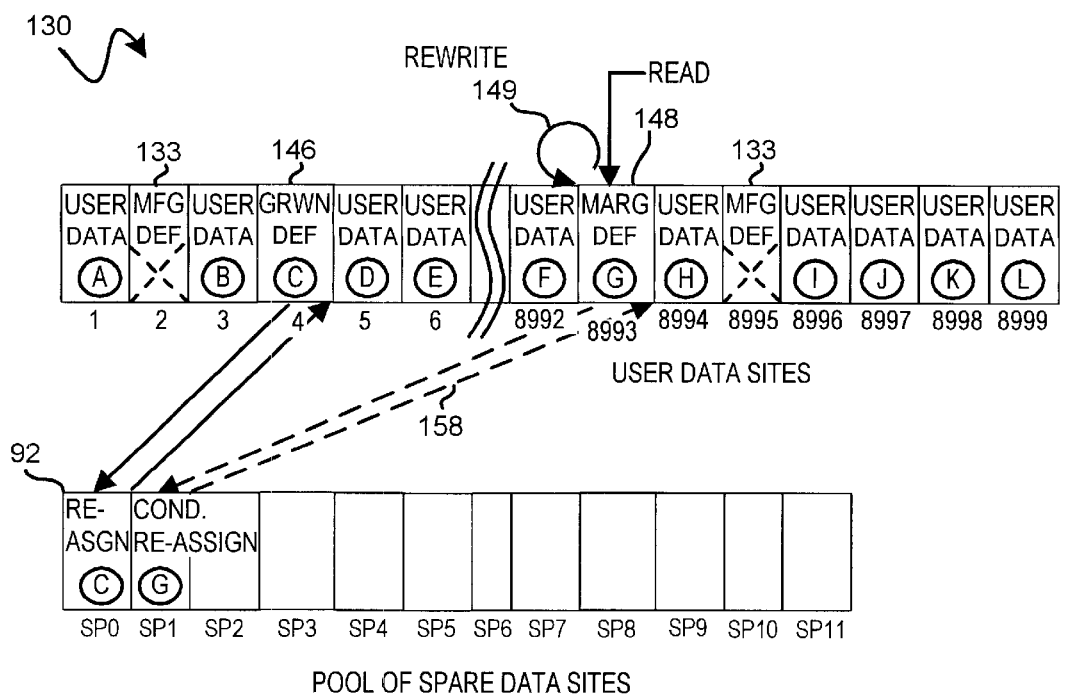
FIG. 5 illustrates an embodiment of the present invention, wherein a rewrite with embedded reassign method is employed for data recovery from marginally defective data sites.
Figure 5:
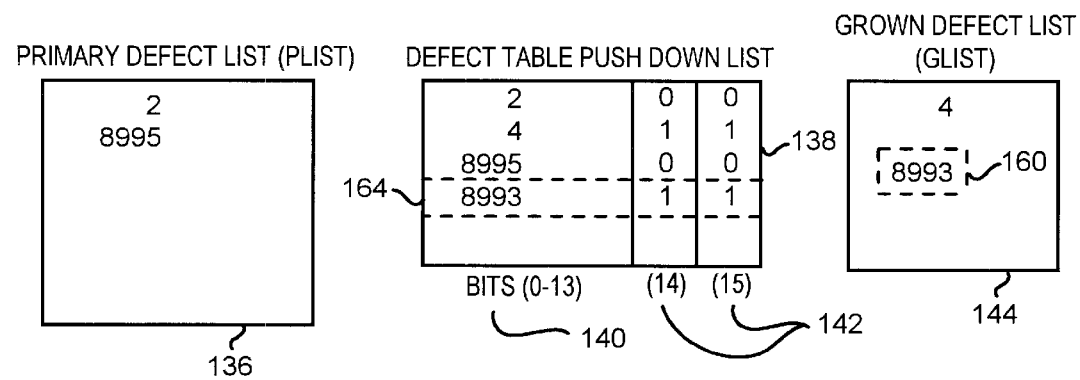
Figure 5:
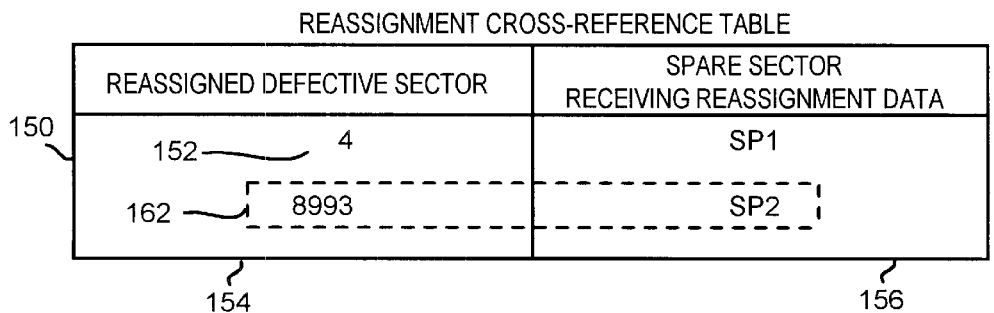

FIG. 5 illustrates an embodiment of the present invention, where a rewrite with embedded reassign method is employed for data recovery from marginally defective data sites, illustrated generally at 130. As described previously, the disk drive surface includes a plurality of data sites 78 which are used to store user data. After manufacturing, the disk drive surface is analyzed in order to identify data sites 133 which are defective. In the illustrated embodiment, user data sites 78 located at addresses "2" and "8995" contain manufacturing defects (also known as primary defects). These defective data sites 133 must be identified and recorded so that they may be avoided during normal operation of the drive. As a result, the addresses of these defective data sites are recorded in a primary defect list (PLIST) 136, and also in an operational defect table (i.e., push-down list) 138.

Primary defect list 136 is used to archive the addresses of defective data sites discovered after manufacturing so that users can retrieve the information at a later time. As an example, the number of data sites residing on primary defect list 136 provides the user with a generalized indication of disk media quality. Operational defect table 138 is referenced during the operation of the drive by firmware located within the disk control system in order to identify data sites 78 to avoid while performing data read and write operations.

Each primary defect entry recorded within operational defect table 138 contains two fields: a location field 140 and an entry type field 142. The defect table 138 a sixteen bit format i.e. bits 0–15, wherein the location field 140 records an address reference for the defect in bits 0–13, and the entry type field 142 includes a defect identifier which is recorded in bits 14 and 15 shown as "11" for primary defect entries. Primary defect entries recorded within operational defect table 138 are typically skip type entries, wherein each skip type entry represents a single sector location on the disk surface. Thus, when operational defect table 138 is generated at format time, multiple operational defect table entries may be generated for a given primary defect, when the primary defect encompasses multiple sectors. Each primary defect is indicated within operational defect table 138 as a skip type entry by recording the appropriate setting in the entry type field 142. The settings within the entry type field of the primary defect entry recorded within operational defect table 138 indicates that the address is to be skipped during the operation of the drive.

During the operation of the disk drive, defects can develop in user data sites 78. Defects which develop during operation of the drive are known as grown defects. In the illustrated embodiment, the data site located at address "4" is identified as a grown defect data site, as indicated at 146. As a result, the address of data sites experiencing grown defects 146 are recorded in a grown defect list (GLIST) 144 and also in the operational defect table 138.

Firmware executed within the disk drive control system uses a scoring algorithm during normal read operations to determine when user data sites 78 are in the process of developing grown defects. The data site located at address "8993" is identified as a data site that is potentially developing into a grown defect. Such a data site is known as a "marginally defective" data site, shown at 148.

The scoring algorithm looks at performance attributes such as the number of retries required to read information from a data site when determining whether a data site is suffering a grown defect. Once the scoring algorithm determines that the data site is becoming unusable (i.e., marginally defective) as a result of a grown defect, the data site is marked, and the data block recorded at the marginally defective site must either be rewritten back to the marginally defective site, as shown at 149, or reassigned to a spare data site at an alternate location, as shown at 92.

It is almost always preferable to attempt to rewrite the data from marginal data site 148 back to the marginal data site before reassigning the data to a spare data site 92. In the illustrated embodiment, once the data site 148 at address "8993" has been identified as a marginally defective data site, the data block from the data site is copied to the next available spare data site "SP1" in the pool of spare data sites 92. Note that this operation is only a conditional reassignment (i.e., no pointers have been set up from the marginally defective data site to the spare data site at this time). Next, the data block from the marginally defective data site is rewritten 149 to the marginally defective data site. If the rewrite operation is successful, the conditional reassignment is never completed. However, if the rewrite operation is not successful, the conditional reassignment is finalized. Pointers 158 are established from the marginally defective data site 148 to the spare data site 92 via an entry 162 in a re-assignment cross-reference table 150. Entry 162 includes a reference to the defective data site which is reassigned, shown at 154, along with a corresponding reference entry to the spare data site receiving the reassignment, as shown at 156. Marginally defective data site 148 is identified as a grown defect in the grown defect list 144, as shown at 160. Marginally defective data site 148 is also identified as a grown defect in operational defect table 138, as shown at 164. Finally the pointer to the next available spare data site SP2 in the pool of spare data sites 92 is incremented.

Grown defect list 144 is used to archive the addresses of defective data sites discovered during normal disk operation so that user can retrieve the information at a later time. As an example, the number of data sites residing on grown defect list 144 provides a generalized indication as to the disk media quality. Operational defect table 138 is referenced during the operation of the drive by firmware within the disk control system to identify grown defect sites which have been reassigned to alternate data sites on the disk surface. In contrast to the skip type entries of primary defects, grown defect sites are typically not skipped, but are redirected to alternate data site locations on the disk, which contain the reassigned data of the data site experiencing the grown defect.

Each grown defect entry recorded within operational defect table 138 contains two fields: the location field 140 and the entry type field 142. The location field 140 has a sixteen bit format, wherein the address of the defect is recorded in bits (0–13), and the entry type field 142 includes a defect identifier which is recorded in bits 14 and 15. Grown defect entries recorded with the defect table are typically vector type entries. Grown defects are indicated as vector type entries by recording the appropriate settings in entry type field 142 shown as "00" for vector type entries. The settings of bits 14 and 15 of entry type field 142 recorded within operational defect table 138 indicate that the grown defect data site is to be vectored to an alternative data site during the operation of the disk drive.

The present invention provides a two-pronged approach to recovering data from marginally defective data sites on a disk surface. As a rewrite operation is attempted to a marginally defective data site, a conditional reassignment operation is initiated by copying the data block from the marginally defective data site to a spare data site. Should the rewrite operation fail, the conditional reassignment already in progress is made permanent and by having anticipated such reassignment the operation is completed without further disk activity.

I claim:

1. A method for operating a disk drive, including recovering data from a marginally defective data site on a disk surface, wherein the hard disk drive employs a vector reassignment method to reassign data from defective data sites to spare data sites, the method comprising the steps of:

determining the data site to be a marginally defective data site characterized by an increased recoverable error frequency as determined by a predefined performance threshold;

first writing the block of data to a spare data site within a pool of spare data sites to create a conditional reassignment of the marginally defective data site when the predefined performance threshold is exceeded;

then determining whether the marginally defective data site is a defective data site based upon an unsuccessful recovery operation; and if the marginally defective data site is a defective data site, then:

marking the marginally defective data site as a defective data site;

adding the defective data site to a list of defective data sites;

updating a vector reassignment table to cross-reference the defective data site to the spare data site to finalize the reassignment.

2. The method of claim 1, wherein the step of determining whether the marginally defective data site is a defective data site further comprises the steps of:

writing the block of data back to the marginally defective data site; and verifying that the block of data written back to the marginally defective data site can be successfully read.

3. The method of claim 1, wherein a scoring method is utilized to determine whether a data site is a marginally defective data site.

4. The method of claim 3, wherein the scoring method includes an analysis of the number of retries encountered while reading the data site during normal operation of the disk drive.

5. The method of claim 1, wherein checkpoint information is saved after selected method steps, such that if an interruption occurs during the data recovery, the data recovery process may be completed.

6. The method of claim 5, wherein if a interruption occurs while writing the block of data back to the marginally defective data site, the marginally defective data site is reassigned.

7. The method of claim 1, wherein the step of updating the vector reassignment table to cross-reference the defective data site to the spare data site further comprises:

defining a vector cross-reference entry for the vector reassignment table associated with the list of defective data sites, the vector cross-reference entry comprising:

a reference to the defective data site which is reassigned;

a corresponding reference to the spare data site; and making a vector cross-reference entry in the vector reassignment table to cross-reference the defective data site with the corresponding spare data site.

8. The method of claim 7, wherein the spare data site is chosen from one or more spare data sites located on the disk.

9. The method of claim 8, wherein the one or more spare data sites are grouped into a contiguous pool of spare data sites.

10. The method of claim 9, wherein a single pool of spare data sites exists on each disk.

11. The method of claim 1, wherein if the marginally defective data site is a defective data site, the method further comprises the step of incrementing a pointer to point to the next available spare data site within the pool of spare data sites.

12. The method of claim 1, wherein the method is implemented in firmware residing within a disk control system of the disk drive.

13. In a disk drive, a method for recovering data from a marginally defective data site on a disk surface, the method comprising the steps of:

providing a pool of spare data sites;

providing a read error recovery procedure, the read error recovery procedure comprising a plurality of recovery steps;

reading a data block from a user data site and, if an error occurs while reading the data block:

executing the read error recovery procedure to recover the data block;

determining that the user data site is marginally defective based upon an increased recoverable error frequency in the user data site which exceeds a predefined performance threshold;

conditionally reassigning the data block to a conditionally reassigned spare data site within the pool of spare data sites;

writing a copy of the data block to the conditionally reassigned spare data site;

writing the data block in the user data site;

performing a predetermined subset of the plurality of recovery steps to recover the data block; and if the data block is not recovered within the predetermined subset, then:

reassigning the data block to the conditionally reassigned spare data site to finalize the reassignment.

14. The method of claim 13, wherein the step of reassigning the data block to the conditionally reassigned spare data site further comprises:

marking the marginally defective data site as a defective data site;

adding the user data site to a list of defective data sites; and updating a vector reassignment table to cross-reference the defective data site to the spare data site.

15. The method of claim 14, wherein the step of updating the vector reassignment table cross-reference the defective data site to the spare data site further comprises:

defining a vector cross-reference entry for the vector reassignment table associated with list of defective data sites, the vector cross-reference entry comprising:

a reference to the defective data site which is reassigned;

a corresponding reference to the spare data site; and making a vector cross-reference entry in the vector reassignment table to cross-reference the defective data site with the corresponding spare data site.

16. The method of claim 13, wherein checkpoint information is saved after selected method steps, such that if an interruption occurs during the data recovery, the data recovery process may be completed.

17. The method of claim 16, wherein if an interruption occurs while writing the block of data back to the marginally defective data site, the marginally defective site is reassigned.

* * * * *